(12) United States Patent
Roundy

(10) Patent No.: US 7,540,467 B2
(45) Date of Patent: *Jun. 2, 2009

(54) ACTUATOR ASSEMBLY WITH ROTATIONAL COUPLER IN-LINE WITH ROTATIONAL VALVE SHAFT

(75) Inventor: James S. Roundy, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 200 days.

This patent is subject to a terminal disclaimer.

(21) Appl. No.: 11/680,274

(22) Filed: Feb. 28, 2007

(65) Prior Publication Data

US 2008/0203338 A1    Aug. 28, 2008

(51) Int. Cl.
*F16K 31/12* (2006.01)

(52) U.S. Cl. .................. 251/58; 251/63.6; 251/305

(58) Field of Classification Search .................. 251/58, 251/62, 63.5, 63.6, 305
See application file for complete search history.

(56) References Cited

U.S. PATENT DOCUMENTS

| 2,883,144 | A |  | 4/1959 | Kendig |  |
| 2,998,805 | A |  | 9/1961 | Usab |  |
| 4,504,038 | A |  | 3/1985 | King |  |
| 4,634,094 | A |  | 1/1987 | Geiser |  |
| 4,658,858 | A | * | 4/1987 | Beale | 137/606 |
| 5,134,923 | A | * | 8/1992 | Wexler | 92/31 |
| 5,419,237 | A | * | 5/1995 | Jeppsson | 92/31 |
| 6,032,920 | A |  | 3/2000 | Takahashi et al. |  |
| 6,113,063 | A |  | 9/2000 | Takahashi et al. |  |
| 6,354,562 | B1 | * | 3/2002 | Fukano et al. | 251/30.03 |
| 6,494,434 | B1 |  | 12/2002 | Geiser |  |
| 6,793,194 | B1 | * | 9/2004 | Grinberg | 251/58 |
| 7,300,035 | B2 | * | 11/2007 | Davis et al. | 251/285 |

* cited by examiner

*Primary Examiner*—John K Fristoe, Jr.
(74) *Attorney, Agent, or Firm*—Ingrassia Fisher & Lorenz, P.C.

(57) ABSTRACT

An actuator assembly including an actuator housing assembly having a linear drive mechanism disposed at least partially therein. A linear variable differential transducer (LVDT) is coupled to the linear drive mechanism and configured to eliminate rotation of the linear drive mechanism and provide linear positioning of the linear drive mechanism. A valve shaft is coupled to the linear drive mechanism and in substantially linear alignment with the linear drive mechanism. A rotational coupler, in the form of a helical groove and reciprocating guide member, is formed to couple the linear drive mechanism to the valve shaft. The valve shaft is configured to allow for the linear displacement therein of the linear drive mechanism and thereby output a rotation moment via the rotational coupler to the valve shaft.

15 Claims, 5 Drawing Sheets

ACTUATOR ASSEMBLY WITH ROTATIONAL COUPLER IN-LINE WITH ROTATIONAL VALVE SHAFT

FIELD OF THE INVENTION

The present invention relates to valve actuation and, more particularly, to valves including rotating members and the actuation of such valves by transferring a linear input motion to a rotary output motion and thereby controlling operation of the valve.

BACKGROUND OF THE INVENTION

Actuators are used in myriad devices and systems for the control of rotary valves. For example, many vehicles including, for example, aircraft, spacecraft, watercraft, and numerous other terrestrial and non-terrestrial vehicles, include one or more actuators to effect the movement of various rotary valve components, such as butterfly valves, ball valves, etc. One type of actuator that has been designed and implemented with rotary valves is a linear actuator.

In many instances a rotary valve and electromechanical actuator (EMA) are mounted to the vehicle and thereby increase the overall weight of the vehicle. Typically, these rotary valve and EMA systems include pressurized fluid that enters and expandable chamber to drive a piston, which is mechanically connected to a valve shaft of the rotary valve. This driving action by the piston causes the valve shaft to open or close the rotary valve.

These types of traditional rotary actuators are known in the art to control the operation of an associated valve by converting the linear stroke of the piston to a rotational movement of a driving member that engages the valve. The actuator is typically mounted in a cantilevered position relative to the valve body and includes a multi-sectioned lever type actuating arm that moves in response to the linear movement of the piston. The cantilevered actuator in these types of systems creates a high overhang moment. In addition, this type of offset piston drive valve includes a relatively long piston stroke to actuate the valve, thereby increasing the weight of the overall valve.

It should thus be appreciated from the above that it would be desirable to provide a compact and lightweight electromechanical actuator and valve assembly that eliminates the long piston stroke and high overhang moment. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

There has now been developed an actuator assembly for operation of a rotational valve comprising: an actuator housing assembly; a linear drive mechanism; a valve shaft; and a rotational coupler. The linear drive mechanism is disposed at least partially within the actuator housing assembly and configured to translate therein without rotation. The valve shaft is in substantially linear alignment with, and surrounding at least a portion of the linear drive mechanism. The rotational coupler couples the linear drive mechanism to the valve shaft and is configured to translate linear displacement of the linear drive mechanism into rotation of the valve shaft.

In yet another embodiment there is provided an actuator assembly for operation of a rotational valve comprising: and actuator housing assembly; a piston body; a valve shaft; and a rotational coupler. The piston body is disposed at least partially within the actuator housing assembly and configured to translate therein without rotation. The valve shaft includes a first end portion coupled to the rotational valve and a second end portion coupled to the piston body and providing displacement therein of the piston body. The valve shaft is in substantially linear alignment and surrounding at least a portion of the piston body. The rotational coupler couples the piston body within the second end portion of the valve shaft, and is configured to translate linear displacement of the piston body into rotation of the valve shaft.

In a further embodiment, still by way of example only, there is provided a linear actuator assembly for operation of a butterfly valve comprising: an actuator housing assembly; a piston body; a butterfly valve shaft; and a rotational coupler. The piston body is disposed at least partially within the actuator housing assembly and configured to translate therein without rotation. The butterfly valve shaft includes a first end portion coupled to the butterfly valve and a second end portion coupled to the piston body and provides displacement therein of the piston body. The butterfly valve shaft is in substantially linear alignment and surrounding at least a portion of the piston body. The rotational coupler comprises a helical groove and a guide member configured to engage the helical groove. The rotational coupler couples the piston body within the second end portion of the butterfly valve shaft. The butterfly valve shaft is configured to translate linear displacement of the piston body into rotation of the valve shaft.

Other independent features and advantages of the improved actuator assembly will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figure, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, before proceeding with the detailed description, it is to be appreciated that the described embodiment is not limited to use in conjunction with a specific vehicle or system. Thus, although the description is explicitly directed toward an embodiment that is implemented in an aircraft actuation control system, it should be appreciated that it can be implemented in many types of vehicles and other actuation system designs, including those known now or hereafter in the art. Furthermore, the present invention is directed to the actuation of valves with rotatable valve members, such as butterfly valves, ball valves, throttle valves, or the like. It should be appreciated that other types of valves could be actuated by the proposed invention in which it is required to convert an input linear motion into an output rotary motion for valve operation.

Figure 1:
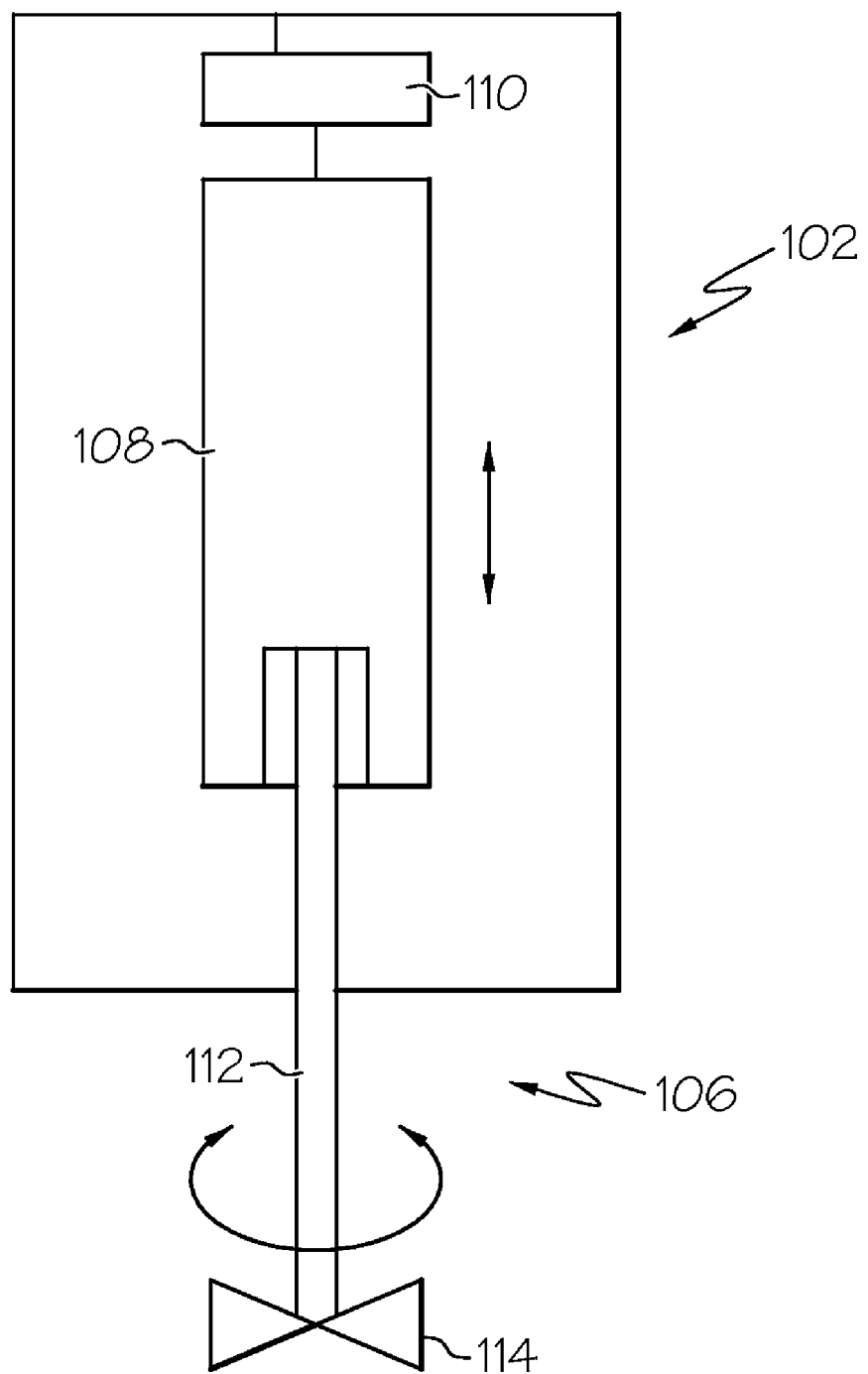
FIG. 1 is a block diagram of an exemplary actuation control system, including an actuator assembly and valve according to the present invention.

Turning now to the description and with reference first to FIG. 1, a functional block diagram of an exemplary valve and actuation control system 100 is shown. The system 100, which may be used, for example to control the actuation of one or more valves, includes an actuator assembly 102 and a valve flow body assembly 106. The actuator assembly 102, which in this particular embodiment is preferably configured as a linear actuator, includes a piston drive mechanism 108, and a position sensor 110.

The piston drive mechanism 108 is configured, upon fuel activation to supply a linear drive force. The piston drive mechanism 108 is coupled to the valve flow body assembly 106 via a valve shaft 112 that couples the drive mechanism 108 and a valve plate 114. The linear drive force supplied from the piston drive mechanism 108 is transferred to the valve shaft 112 by way of a rotational coupler (described presently). The configuration of the rotational coupler causes rotational motion of the valve shaft 112, thereby moving the associated valve plate 114 to a desired position. It should be noted that as schematically represented, the actuator assembly 102 is mounted directly above and in-line with the valve flow body assembly 106 to eliminate the cantilevered configuration of a traditional piston drive valve.

Figure 2:
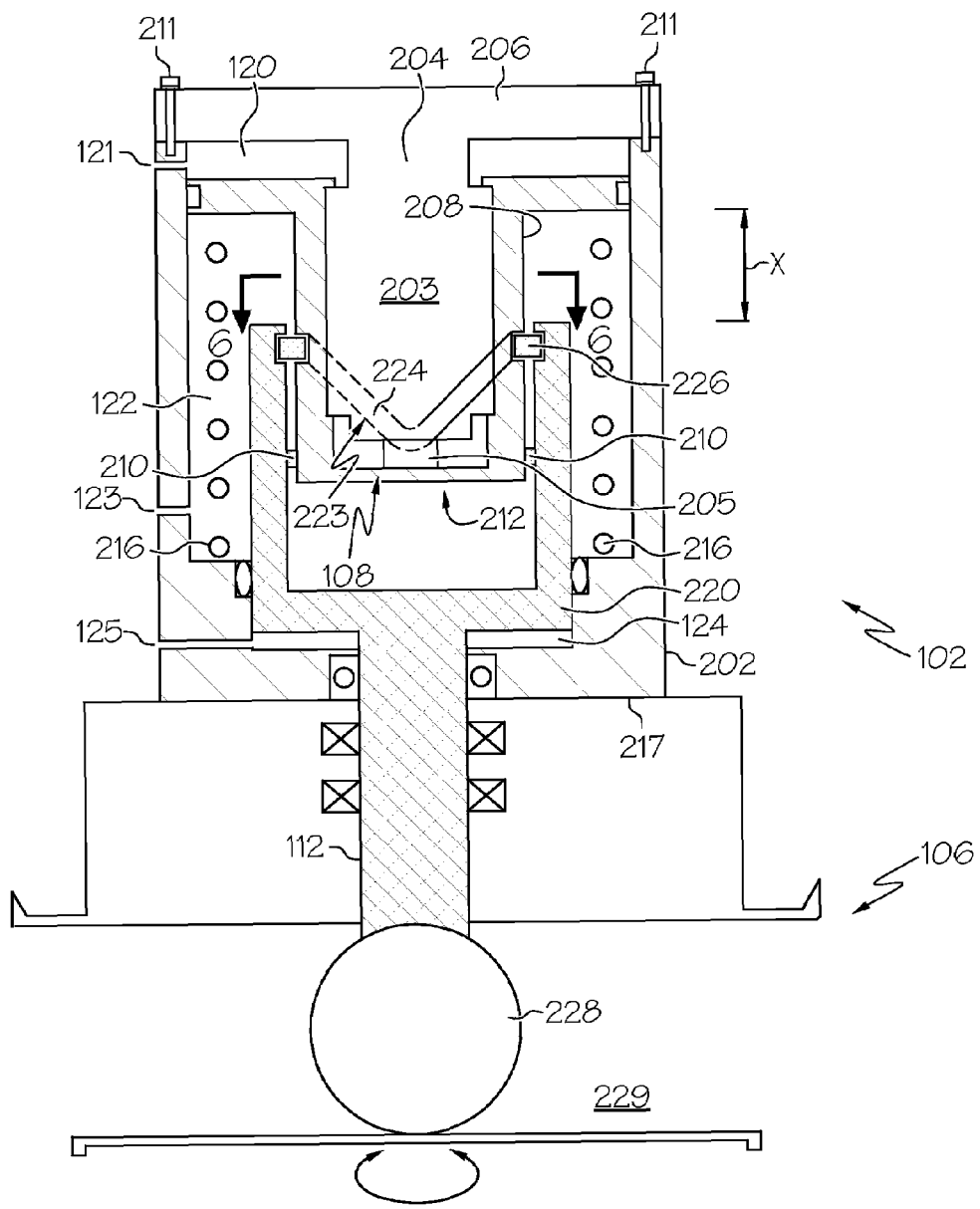
FIG. 2 is a cross-sectional view of a portion of an exemplary actuator assembly according to the present invention.

Turning to FIG. 2, although it should be understood that any type of linear actuator mechanism is anticipated by this application, an embodiment of a particular preferred physical implementation of the actuator assembly 102 and a portion of the valve assembly 106 described above is shown in cross-section, and will now be described in more detail. In this particular embodiment, the depicted actuator assembly 102 is implemented with the piston drive mechanism 108 disposed within and supported on a single actuator housing assembly 202. The actuator housing assembly 202 completely encloses or supports the actuator components, and may include a plurality of self aligning bearings and seals (not shown) that are used to support the actuator housing assembly 202 when mounted to a vehicle. In the illustrated embodiment, the area on either side of the piston drive mechanism 108 is equal, thus pressurized fuel is exposed to the same amount of displacement area. This type of device is commonly referred to as a full area device. In this particular embodiment, the depicted actuator assembly 102 includes a plurality of fuel pressure areas: $P_{head}$ 120, $P_{rod}$ 122 and $P_{drain}$ 124. A $P_{head}$ port 121, a $P_{rod}$ port 123, and a $P_{drain}$ port 125 are provided to supply and drain fuel within the actuator assembly 102 or that may leak from around the seals (described presently).

Turning now to a description of the components mounted within or on the actuator housing assembly 202, it will be appreciated that in this particular embodiment the actuator assembly 202 is fuel actuated. The actuator housing assembly 202 includes a linear variable differential transducer (LVDT) 204, which includes an outer LVDT housing 203 that surrounds a portion of at least one LVDT rod(s) 205. In this particular embodiment, a top portion of the LVDT housing 203 serves as a cover 206 for the housing assembly 202. The LVDT 204 is positioned within, and the LVDT rod(s) 205 is configured to move with the piston drive mechanism 108. The LVDT 204 provides an output of voltage, current, or serial data proportional to the measurement position of the LVDT 204. This data enables position sensing of the piston drive mechanism 108. In an alternate embodiment described herein, the LVDT sensor does not form the cover plate and a separately formed cover plate is used for the cover of the housing assembly 202. As will be described below, during operation the LVDT 204 provides anti-rotation of the piston drive mechanism 108 within the actuator housing assembly 202.

The piston drive mechanism 108 includes a typical piston body 208 that is linearly displaceable relative to a plurality of stationary piston guides 210 that are fixedly coupled to the piston body 208. The piston body 208 is configured to move over a preset range "x", as graphically indicated in FIG. 2, during actuation. The plurality of piston guides 210 are preferably formed of a material having a low friction coefficient to enable sliding of the piston body 208 within the end portion (discussed presently) of the LVDT 204. An optional coil spring 216 is disposed between the piston body 208 and the actuator housing assembly 202. The coil spring 216 is depressed when the piston body 208 is linearly displaced toward an end portion 217 of the actuator housing assembly 202. The coil spring 216, when depressed, supplies a bias force that moves the piston body 208 toward the cover plate 206. The valve shaft 112 is configured at an end portion 220 to allow for the rotary displacement, with linear displacement of a portion of the piston body 208.

In this particular embodiment, the piston body 208 includes a rotational coupler 223 in the form of a helical groove 224 formed in an exterior of the piston body 208. The end portion 220 of the valve shaft 112 includes a guide member 226 that is at least partially disposed within or inserted into the helical groove 224. Thus, during actuation and linear displacement of the piston body 208, the valve shaft 112 is rotated, which in turn rotates a valve plate 228 coupled to the valve shaft 112, thereby opening or closing of the valve plate 228 and controlling flow therethrough a valve flow body 229. In an exemplary embodiment, the helical groove 224 is shaped to produce limited rotation at the start of the opening of the valve plate 228 thus limiting the flow to any devices downstream of the valve plate 114 during the initial opening of the plate. This slow opening rate may replace any rate control servo functions present in the device.

As illustrated in FIG. 2, the piston drive mechanism 108 is substantially inline with the valve shaft 112 and the valve plate 228. In a preferred embodiment, the valve shaft 112 may be formed at an approximate 14°, offset relative to the valve shaft 112, to provide sealing capability of the valve plate 228 relative to the valve flowbody 229.

The design includes fewer moving parts than a typical piston drive valve and a redundant torque path that is different than a single link/lever arm attached to a piston end. The proposed actuator assembly 102 reduces the size and weight of the actuator assembly and eliminates the cantilevering of the actuator assembly above the flow body, resulting in a rigid valve design to withstand vibration of the actuator during operation and a reliable device.

Figure 3:
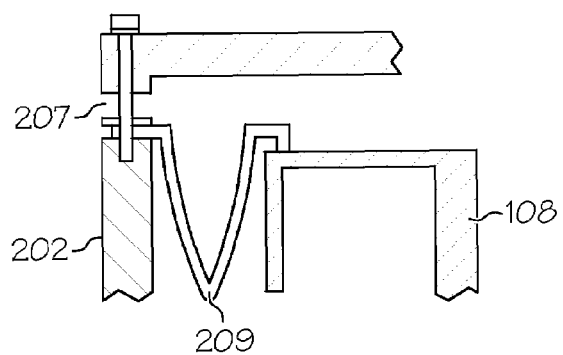
FIG. 3 is a cross-sectional view of a portion of another embodiment of the actuator assembly according to the present invention.

Referring now to FIG. 3, illustrated is a portion of the actuator assembly of FIG. 2, but in this particular embodiment, the actuator assembly is air actuated and incorporates a diaphragm. More specifically, illustrated in FIG. 3 is a portion of the actuator housing assembly 202 and the piston drive mechanism 108. In lieu of fuel activation and the incorporation of static and dynamic seals, a diaphragm 209 is provided at an air inlet 207 in the actuator housing assembly 202. The diaphragm 209 provides for air pressure changes, and thus actuation of the piston drive mechanism 108.

Figure 4:
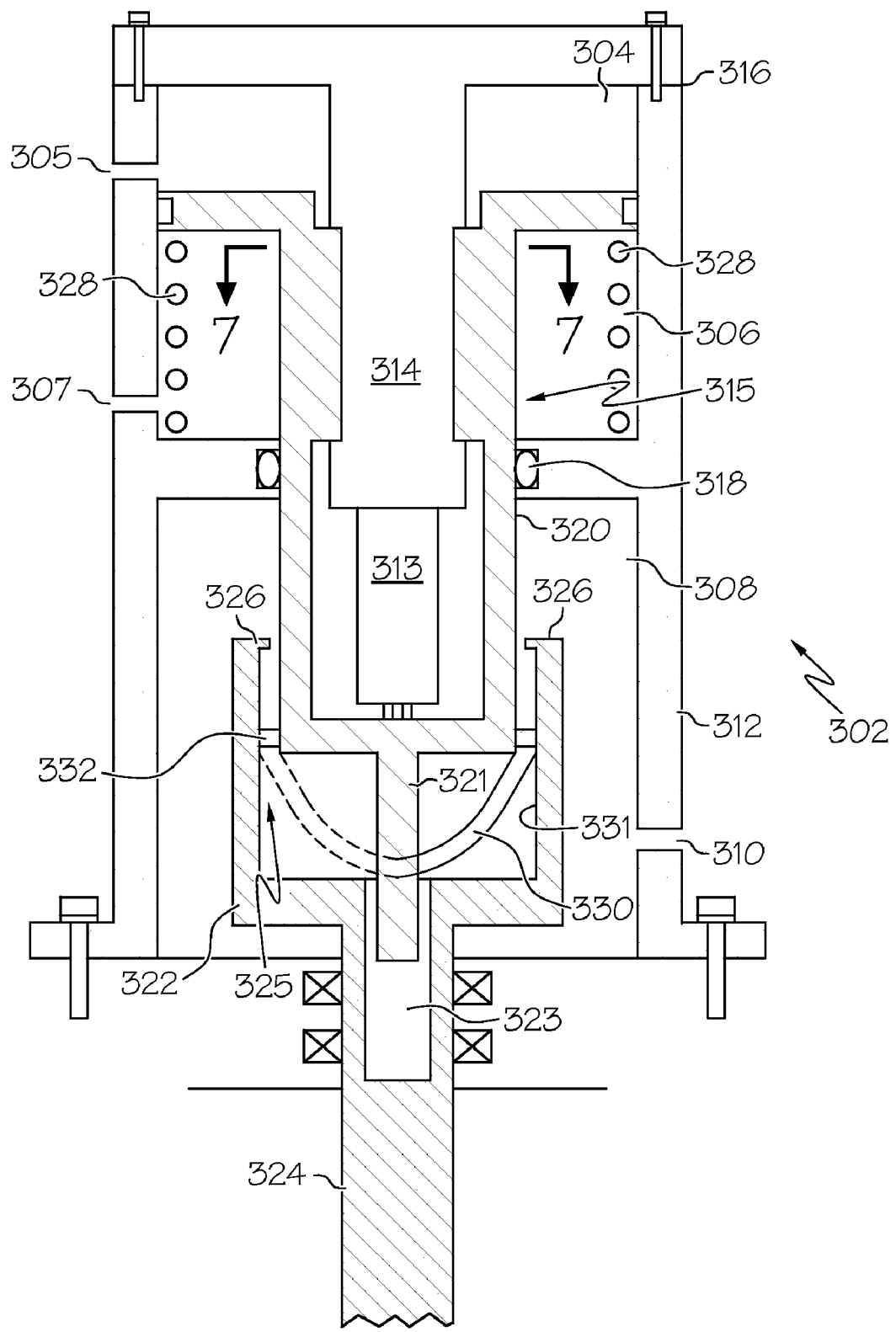
FIG. 4 is a cross-sectional view of a portion of yet another embodiment of the actuator assembly according to the present invention.

Referring now to FIG. 4, illustrated is a cross-sectional view of another embodiment of an actuator assembly according to the present invention. The actuator assembly 302 illustrated in FIG. 4 is fuel actuated and includes similar physical implementations of the various actuator components described in FIG. 2. In this particular embodiment, the depicted actuator assembly 302 includes a half area piston option in which included are fuel pressure areas $P_{head}$ 304, $P_{rod}$ 306 and $P_{drain}$ 308. Similar to the previous embodiment, a $P_{head}$ port 305, a $P_{rod}$ port 307, and a $P_{drain}$ port 310 are provided to supply and drain fuel within the actuator assembly 302. An advantage of using the half area piston is that the fuel supply to the actuator assembly 302 does not require pressure regulation. Therefore, an un-regulated fuel pressure can be used to operate an associated valve, reducing the overall system cost and complexity.

Similar to the previously described embodiment, the actuator assembly 302 includes an actuator housing 312, having housed therein an LVDT sensor 314, including at least one LVDT rod 313, and a piston drive mechanism 315. A static seal 316 is created where the LVDT sensor 314 is coupled to the actuator housing 312. A dynamic seal 318 is created where the actuator housing 312 is coupled to the piston drive mechanism 315. Similar to the first embodiment, the piston drive mechanism 315 includes a piston body 320 that is linearly displaced within the actuator housing 312, and more particularly within an end portion 322 of a valve shaft 324. In contrast to the previous embodiment, the piston body 320 includes an end portion 321 protruding therefrom that, during operation, moves within a void 323 formed in the valve shaft 324. The end portion 321 acts as a secondary guide during operation of the piston drive mechanism 315 and is optional.

A plurality of piston guides 326 are positioned to guide the piston body 320 within the end portion 322 of the valve shaft 324 during linear displacement as previously described with respect to FIG. 2. An optional coil spring 328 is provided to aid in linear displacement of the piston body 320 during operation and provides a bias force during a backward linear motion. Similar to the first embodiment, a rotational coupler 325 is provided to aid in generating the rotational force of the valve shaft 324. More specifically, in this particular embodiment and in contrast to the previous embodiment, a helical groove 330 is formed on an interior surface 331 of the valve shaft 324. As illustrated, a guide member 332 is formed on the piston body 320 and engages the helical groove 330. This engagement of the guide member 332 with the helical groove 330 provides the necessary linkage between the piston body 320 and the valve shaft 324 during operation.

During operation, the piston body 320 translates and pushes on the rotational coupler 325, and more particularly on guide member 332 that pushes on the helical groove 330, thus rotating the valve shaft 324. This type of drive mechanism enables the actuator assembly 302 to be mounted directly above and inline with the valve shaft 324, thus eliminating the cantilevered nature of the piston drive mechanism and reducing damage due to vibration.

Figure 5:
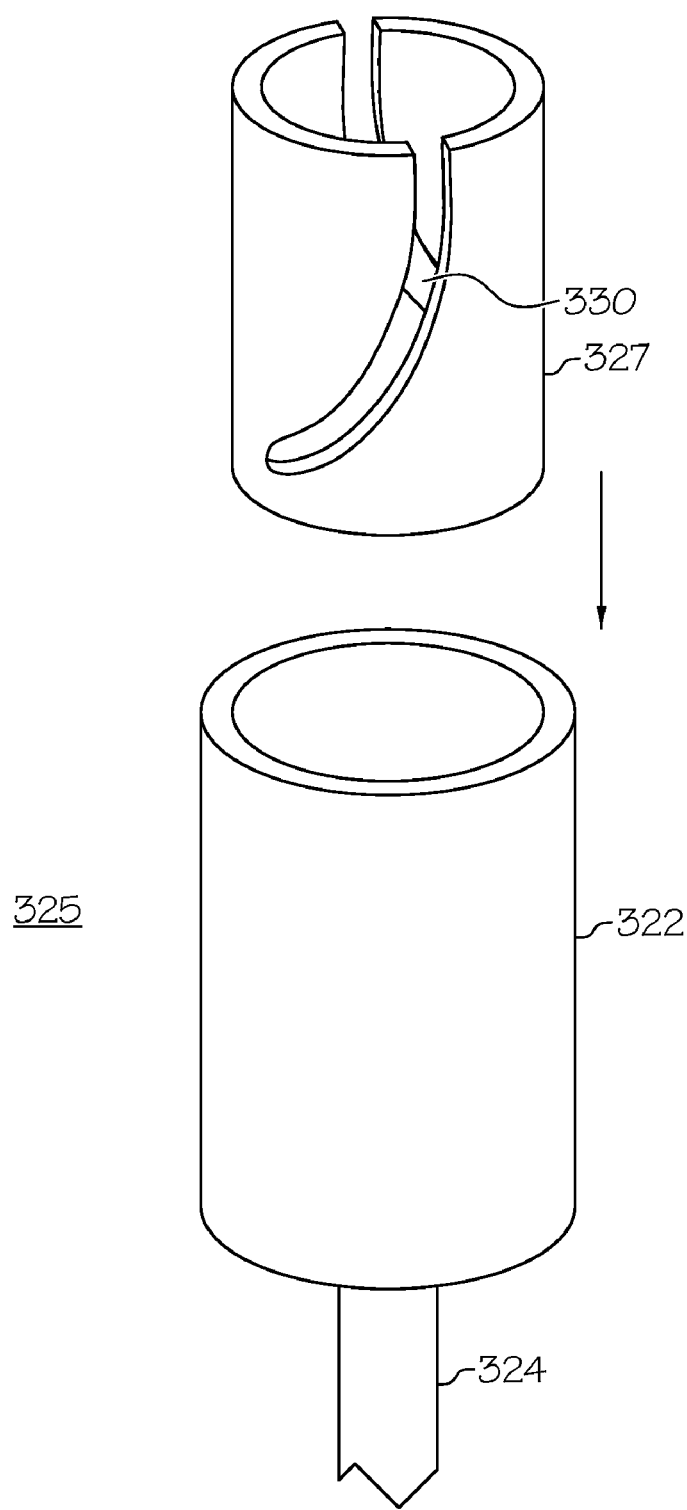
FIG. 5 is an isometric view of a of a portion of yet another embodiment of the actuator assembly according to the present invention.

Referring now to FIG. 5, illustrated is an isometric view of a portion of the rotational coupler 325, and in particular the end portion 322 of the valve shaft 324. As illustrated, the rotational coupler 325 includes the end portion 322 of the valve shaft 324, having positioned therein an inner component 327. In one particular embodiment, the inner component 327 may be separately manufactured, and during assembly of the actuator assembly 102, inserted within the end portion 322. To aid in ease of manufacture, the helical groove 330 is formed in the inner component 327 prior to insertion into the end portion 322. Subsequent to fabrication of the helical groove 330, the inner component 327 is inserted within the end portion 322. In an alternative embodiment, the end portion 322 is formed as a single component having the helical groove 330 formed therein an interior surface.

Figure 6:
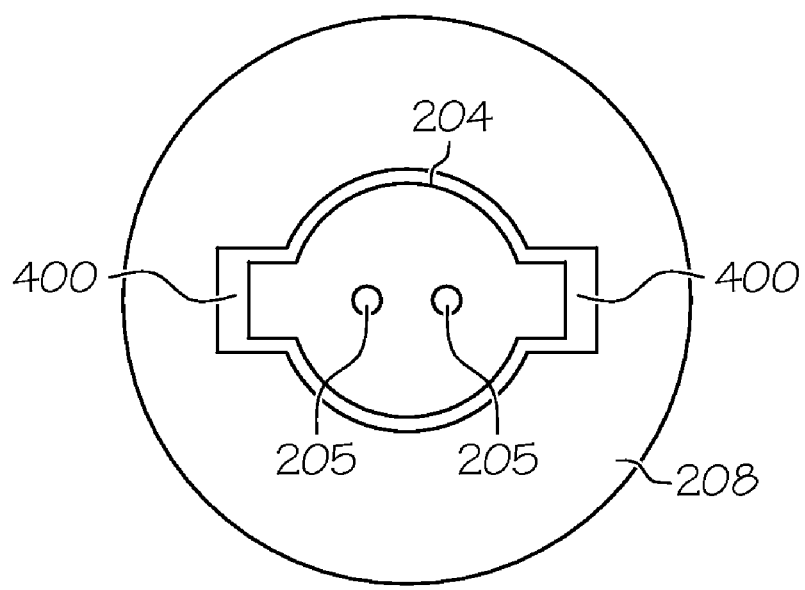
FIG. 6 is a top view of a portion of the actuator assembly according to the present invention.
Figure 7:
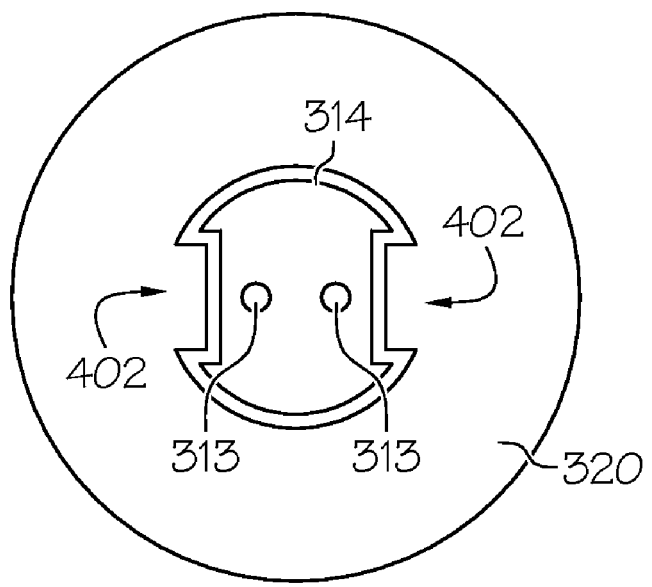
FIG. 7 is a top view of a portion of the actuator assembly according to the present invention.

Referring now to FIG. 6, illustrated is a cross section view, taken along line 6-6 of FIG. 2, illustrating a portion of the LVDT 204 and a portion of the piston body 208. To provide for anti-rotation of the piston body 208 during operation, the LVDT 204 includes a plurality of protruding portions 400 as illustrated in FIG. 6. As an alternative embodiment, illustrated is a cross section view, taken along line 7-7 of FIG. 4, illustrating a portion of the LVDT 314 and a portion of the piston body 320 The LVDT 314 may include a plurality of indents 402 as illustrated in FIG. 7. As previously described, the LVDT 314 is coupled to the actuator housing assembly 202 and in a preferred embodiment serves as the cover 206 (FIG. 2) for the actuator housing assembly. The LVDT 204 is coupled to the actuator housing assembly 202 in a preferred embodiment with a plurality of bolts 211 (FIG. 2) or the like. During operation, the protruding portions 400 or indents 402 serve as an anti-rotation means, and prevent rotation of the piston body 208 relative to the actuator housing assembly 202. The holes 205 (FIG. 2) and 313 (FIG. 4) represent the cavities in the LVDT for position sensing rods 210 (FIG. 2) and 313 (FIG. 4).

While a particular actuator assembly is described with respect to the preferred embodiments, it should be understood that any type of actuator assembly may implement the linear alignment of the actuator assembly and valve assembly of the present invention to reduce vibration effects of the actuator assembly by reducing the overhang moments, and to provide a more reliable device.

Accordingly, disclosed is an improved actuator assembly including a linear inline orientation and a rotational drive mechanism. While exemplary embodiments have been presented in the foregoing detailed description of the invention, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator assembly for operation of a rotational valve, the actuator assembly comprising:
    an actuator housing assembly;
    a linear drive mechanism disposed at least partially within the actuator housing assembly and configured to translate therein without rotation;
    a valve shaft in substantially linear alignment with, and surrounding at least a portion of the linear drive mechanism;
    a rotational coupler coupling the linear drive mechanism to the valve shaft and configured to translate linear displacement of the linear drive mechanism into rotation of the valve shaft; and a linear variable differential transducer (LVDT) disposed at least partially within the actuator housing assembly and coupled to the linear drive mechanism, the linear variable differential transducer (LVDT) including one of a plurality of mating tabs or indents to prevent linear drive mechanism rotation.

2. An actuator assembly as claimed in claim 1, wherein the linear drive mechanism comprises a piston body, mounted for reciprocating linear stroke motion within an end portion of the valve shaft and along a longitudinal axis of the actuator assembly in a first linear direction that translates to a rotational direction.

3. An actuator assembly as claimed in claim 2, further including a coil spring configured to exert a bias force on the piston body that urges the piston body in the linear direction.

4. An actuator assembly as claimed in claim 2, wherein the rotational coupler comprises a helical groove formed on an interior surface of the end portion of the valve shaft and a reciprocating piston guide formed in the piston body.

5. An actuator assembly as claimed in claim 2, wherein the rotational coupler comprises a helical groove formed in the piston body and a reciprocating guide formed on the end portion of the valve shaft.

6. An actuator assembly as claimed in claim 1, wherein the rotational valve is a butterfly valve, including a butterfly valve shaft coupled to a moveable valve plate.

7. An actuator assembly for operation of a rotational valve, the actuator assembly comprising:
an actuator housing assembly;
a piston body disposed at least partially within the actuator housing assembly and configured to translate therein without rotation;
a valve shaft including a first end portion coupled to the rotational valve and a second end portion coupled to the piston body and providing displacement therein of the piston body, the valve shaft in substantially linear alignment and surrounding at least a portion of the piston body;
a rotational coupler coupling the piston body within the second end portion of the valve shaft, and configured to translate linear displacement of the piston body into rotation of the valve shaft; and
a linear variable differential transducer (LVDT) disposed at least partially within the actuator housing assembly and coupled to the piston body with one of a plurality of mating tabs or indents to prevent rotation of the piston body, the linear variable differential transducer (LVDT) providing linear positioning of the piston body relative to the valve shaft.

8. An actuator assembly as claimed in claim 7, wherein the piston body is mounted for reciprocating linear displacement within the second end portion of the valve shaft and along a longitudinal axis of the actuator housing assembly, the piston body moving in a first linear direction and a second linear direction.

9. An actuator assembly as claimed in claim 7, further including a coil spring configured to exert a bias force on the piston body that urges the piston body in the linear direction.

10. An actuator assembly as claimed in claim 7, wherein the rotational coupler comprises a helical groove formed on an interior surface of the second end portion of the valve shaft and a reciprocating piston guide formed in the piston body.

11. An actuator assembly as claimed in claim 7, wherein the rotational coupler comprises a helical groove formed in the piston body and a reciprocating guide formed on the second end portion of the valve shaft.

12. An actuator assembly as claimed in claim 7, further including a diaphragm provided at an air inlet in the actuator housing assembly.

13. A linear actuator assembly for operation of a butterfly valve, the linear actuator assembly comprising:
an actuator housing assembly;
a piston body disposed at least partially within the actuator housing assembly and configured to translate therein without rotation;
a butterfly valve shaft including a first end portion coupled to the butterfly valve and a second end portion coupled to the piston body and providing displacement therein of the piston body, the butterfly valve shaft in substantially linear alignment and surrounding at least a portion of the piston body;
a rotational coupler comprising a helical groove and a guide member configured to engage the helical groove, the rotational coupler coupling the piston body within the second end portion of the butterfly valve shaft, the butterfly valve shaft configured to translate linear displacement of the piston body into rotation of the valve shaft; and
a linear variable differential transducer (LVDT) disposed at least partially within the actuator housing assembly and coupled to the piston body with a plurality of mating tabs to eliminate rotation of the piston body, the linear variable differential transducer (LVDT) providing linear positioning of the piston body relative to the butterfly valve shaft.

14. A linear actuator assembly as claimed in claim 13, wherein the piston body is mounted for reciprocating linear stroke motion within the second end portion of the butterfly valve shaft and along a longitudinal axis of the actuator housing assembly, the piston body moving in a first linear direction and a second linear direction.

15. A linear actuator assembly as claimed in claim 13, further including a coil spring configured to exert a biasing force on the piston body thus displacing the piston body during operation.

* * * * *